United States Patent [19]

Yamada et al.

[11] Patent Number: 4,747,669
[45] Date of Patent: May 31, 1988

[54] LENS DRIVING MEANS IN A CAMERA

[75] Inventors: Minoru Yamada; Eiji Ito; Kenji Miyama; Masataka Sawamura, all of Hachioji, Japan

[73] Assignee: Konishiroku Photo Industry Co., Ltd., Tokyo, Japan

[21] Appl. No.: 796,001

[22] Filed: Nov. 7, 1985

[30] Foreign Application Priority Data

Nov. 8, 1984 [JP] Japan ................... 59-236039
Feb. 6, 1985 [JP] Japan ................... 60-21436
Feb. 6, 1985 [JP] Japan ................... 60-21437

[51] Int. Cl.$^4$ .................... G02B 7/10; G03B 13/18
[52] U.S. Cl. .................... 350/255; 350/429; 354/400
[58] Field of Search ............... 350/255, 242, 429, 430; 354/236, 159, 400

[56] References Cited

U.S. PATENT DOCUMENTS

| | | | |
|---|---|---|---|
| 3,951,522 | 4/1976 | Hashimoto | 350/429 |
| 4,318,593 | 3/1982 | Tsuji et al. | 350/430 |
| 4,540,264 | 9/1985 | Daitoku et al. | 354/400 |
| 4,596,449 | 6/1986 | Iwata et al. | 350/429 |

Primary Examiner—John K. Corbin
Assistant Examiner—Loha Ben
Attorney, Agent, or Firm—Jordan B. Bierman

[57] ABSTRACT

A camera comprising a lens unit which is slidable between two stoppers along an optical axis for varying a focal length thereof, a lens unit driving member having at least two sections which are connected to circumferential parts of the lens unit, means for providing the lens unit driving member with driving force, and a stroke absorbing member through which the driving force is transferred to the lens units, whereby the lens unit is capable of being resiliently pressed toward the stoppers when the means for providing driving force is overrunning.

18 Claims, 2 Drawing Sheets

LENS DRIVING MEANS IN A CAMERA

BACKGROUND OF THE INVENTION

This invention relates to a camera in which a lens unit having a taking lens is made movable and the lens unit is made movable in the direction of the optical axis of the taking lens by a lens driving means.

As for the lens moving mechanisms of miniature-sized cameras, a helicoid-screw type mechanism has so far been most popularly used. In recent years, however, such helicoid-screw type mechanisms are getting difficult to use, because many complicated mechanisms provided around a lens unit require their own spaces and the cost reduction in camera manufacture is hardly to be made.

Particularly in a variable-focussing type camera in which a focal length is varied by moving the lens unit thereof in the direction of the optical axis of the lens unit, such a helicoid-screw cannot be used because of the spaces needed for moving the lens extensively to vary the focal length.

In the so-called retractable lens barrel type cameras which are to be used in the state that the movable lens unit thereof containing a taking lens system is pulled out to a prescribed position, it is substantially essential that the optical axis of the taking lens system is to be maintained vertically to a film plane when the lens unit is pulled out.

Particularly in a double-focus type camera of such a type that the focal length of the taking lens system is switched over to a long focal length when the lens unit is pulled out and to a short focal length when it is retracted by utilizing the above-mentioned retracting function, it is required to stop the movable lens unit in the state that the optical axis of the lens unit is vertical to a film plane when the movable lens unit is pulled out as well as it is retracted.

In the meantime, the above-mentioned movable lens unit is constructed to be a lens barrel of cylindrical shape. Therefore, the lens driving means is arranged to the outside of the circumferential surface of the movable lens unit and is connected to only a position of the circumferential surface of the lens barrel so as to drive the movable lens unit. Resultantly, the movable lens unit receives an unbalanced force, so that the constantly balanced posture thereof with the camera body can hardly be maintained.

To be more concrete, there is a clearance between the lens barrel and the section of inserting the lens barrel to move the lens barrel, and an unbalanced force is applied to the lens barrel by a driving force to be given onto only a position on the circumferential surface of the lens barrel. It will, therefore, result not only to cause a rough operation but also to be unable to keep the optical axis vertical to a film plane in the position of stopping the lens barrel.

In particular, with the advance of wider apertures of taking lens systems and hign-performance built-in shutter mechanisms, the outside diameters of lens barrels are getting large. Accordingly, the above-mentioned phenomena become more remarkable, and the influence thereof on the performance of cameras cannot be disregarded.

To avoid the above-mentioned troubles, the lens mount cannot help coupling to the lens with some clearance between them, and resultantly the direction of the optical axis of the lens is not fixed in a stable state but is constantly in a slightly instable state, and there is a fear that light is leaked from the section coupling to the lens mount. It is, therefore, required to take some countermeasure to avoid the above-mentioned troubles.

OBJECTS AND SUMMARY OF THE INVENTION

It is an object of the invention to provide a camera having a lens driving means which is capable of moving a movable lens unit, without tilting the optical axis of the lens unit, to a position where the lens unit is pulled out or retracted.

Another, object of the invention is to provide a camera added with such a lens moving mechanisms endowed with the functions that the direction of the optical axis of a lens unit is constantly stabilized and the smooth operation thereof can be performed.

A further object of the invention is to provide a camera in which one of the lens driving members connected to a driving source is coupled to one of the positions on the circumferential surface of the lens barrel of the movable lens unit and the other lens driving member combined in a body with the above-mentioned lens driving member is coupled to the corresponding position on the above-mentioned circumferential surface of the lens barrel, so that the driving force of a driving source can be transmitted to the two positions on the lens barrel at the same time, and a lens driving means is so equipped as to move a lens unit in the direction of the optical axis thereof by the lens driving members united in a body capable of working on the lens unit, in two positions apart from each other on the outer circumference of the lens unit.

A still further object of the invention is to provide a camera having a camera lens supporting means capable of moving a lens unit in the direction of the optical axis of the lens unit with supporting and guiding the lens unit in positions apart from each other in the direction of the optical axis; wherein a plurality of rollers brought into pressure contact with the outer circumferential surface of the lens unit are provided to one of the positions to serve as the supporting members for supporting and guiding the lens unit.

BRIEF DESCRIPTION OF THE INVENTION

DESCRIPTION OF THE PREFERRED EMBODIMENTS

Figure 1:
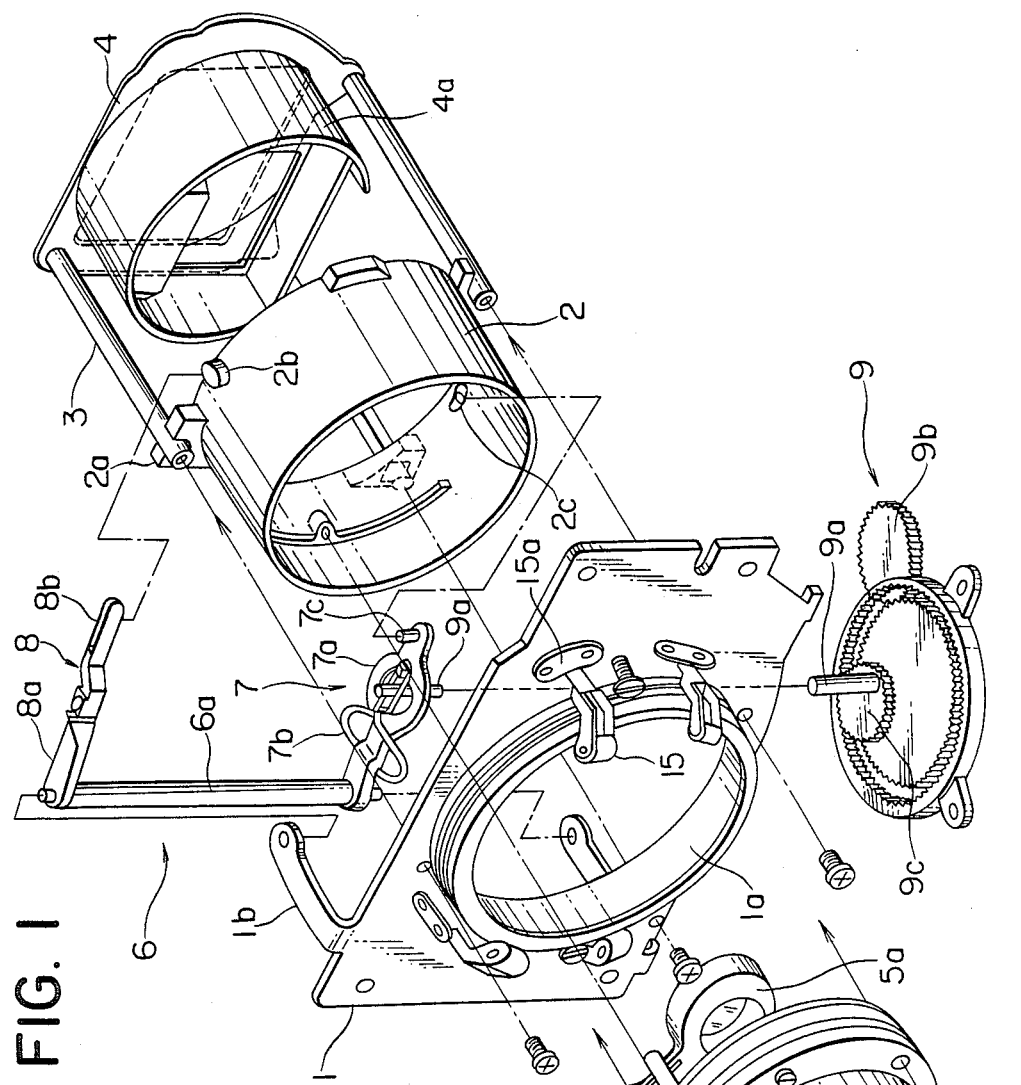
FIG. 1 is an example of the invention showing a movable lens unit having a taking lens, and the driving mechanism thereof.
Figure 2:
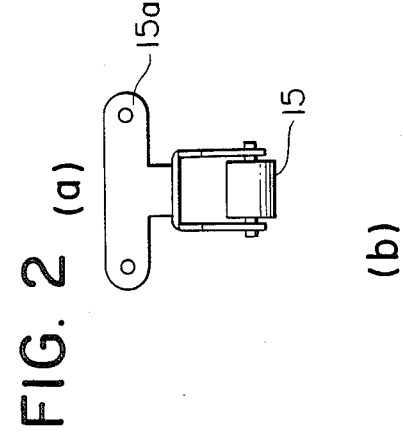
FIG. 2 shows the roller members brought into contact with pressure with the outer circumferential surface of the movable lens unit shown in FIG. 1.

One of the examples of the invention is shown in FIG. 1.

In the drawing, numeral 1 indicates the front plate of a retractable lens barrel type camera, which is incorporated with a lens barrel supported thereby. As for the guiding members for a movable lens unit 2, three straight guiding shafts 3 are fixed each in parallel with the optical axis to the rear side of the front plate 1.

Further, a frame 4 having a light-shielding cylinder 4a is fixed to the rear ends of the straight guiding shafts 3, and they constitute, together with the front plate 1, a unit block independent from the camera body.

The above-mentioned movable lens unit 2 contains therein a double focus type lens 5, and incorporates with the three straight guiding shafts 3 before the above-mentioned frame 4 is fixed to the rear ends of the shafts 3. Three protruded pieces 2a protruded from the outer circumferential surface of the movable lens unit 2 are slidably fitted with the straight guiding shafts 3, respectively, and the outer circumferential surface of the movable lens unit 2 itself is inserted in the inner circumferential surface of lens mount 1a provided to the front plate 1, so that the optical axis of the lens unit 2 can accurately be set to the camera body.

The lens unit 2 is inserted in the lens mount 1a attached to the front plate 1, with a slight clearance between the outer circumferential surface of the lens unit 2 and the inner circumferential surface of the lens mount 1a, and the lens unit 2 is supported and equally pressed in another position in the axial direction by a plurality of rollers 15 each attached to the front face of the front plate 1 to serve as the supporting members for supporting and guiding the lens unit 2. In the clearance between the lens unit 2 and the lens mount 1a, there is provided with an elastic light-shielding member (not shown) so as to prevent a light-leakage.

The described rollers 15 may be made of a metal, and taking into consideration of preventing a scratch on the outer circumferential surface of the lens unit 2, they may preferably be made of a plastic, for example, and they are rotatably held by metal fixtures 15a and are brought into pressure contact with the outer circumferential surface of the lens unit 2 by the elastic force of the metal fixtures 15a so that they can make the optical axis in alignment with the axis of the camera body.

The number and arrangements of the rollers 15 are to be determined according to the weight distributions of the lens unit 2, the dispositions of functions and the like, and they are so constructed as to rotate in accordance with the movements of the lens unit 2 and as not to cause any frictional resistance.

According to such a supporting means as described above, the optical axis of the lens unit 2 is supported by the rollers 15 and is corrected by the centripetal force of the rollers 15 so as to be in constant alignment with the axis of the camera body, and at the same time the lens unit 2 is moved, even in the case that the weight distributions of the lens unit 2 are unbalanced, or that the axis of the guiding shaft 3 is tilted by applying an ill-balanced driving force transmitted from the camera body to the lens unit 2.

It is, therefore, possible to constantly keep the optical axis of double-focus type lens 5 stored in the lens unit 2 in alignment with the axis of the camera body, even the lens 5 is being operated, so that the double-focus type lens 5 can display its performance.

Numeral 6 indicates a lens driving member designed in accordance with the invention, of which the primary section 7 capable of working rigidly to the above-mentioned movable lens unit 2 is fixed to the lower end of connecting rod 6a, and of which the secondary section 8 capable of working elastically is fixed to the upper end thereof, both in a body, so that the lens driving member 6 can be in such a state that it may be coupled by utilizing the elasticity to arms 1b comprising an upper arm and a lower arm in a pair extended from the above-mentioned front plate 1 and it may be supported freely rotatable around the connecting rod 6a.

The above-mentioned primary section 7 comprises a spring 7b that is a stroke absorbing member so suspended as to hold lever 7a fixed to the above-mentioned connecting rod 6a and the protrusion provided to the upper side of the lever 7a, and a pin 7c coupled to a hole 2c provided to the lower part of the circumferential surface of the above-mentioned movable lens unit 2; and a driving pin 9a of planetary gear mechanism 9 is pressed in to be connected to the portion where the above-mentioned spring 7b holds the lever 7a and the protrusion thereof, so that the driving pin 9a may serve as a driving source provided to the camera body side.

On the other hand, the above-mentioned secondary section 8 comprises a lever 8a fixed to the above-mentioned connecting rod 6a and a driving spring 8b in the form of a pair of scissor blades attached to the tip of the secondary section 8; and this driving spring 8b holds a pin 2b riveted to the upper part of the circumferential surface of the above-mentioned movable lens unit 2.

The distance between the connecting rod 6a and the described pin 2b is so provided as to be somewhat longer than that between the connecting rod 6a and the pin 7c of the described primary section 7.

When the driving gear 9b of the described planetary gear mechanism 9 is rotated by the revolution of a motor, the planetary gear mechanism 9c is rotated and at the same time moved around the sun-gear so as to reciprocate the driving pin 9a straight, as is well-known.

When the described driving pin 9a advances in the direction of the optical axis, the connecting rod 6a is rotated clockwise, and the hole 2c and the pin 2b each of the movable lens unit 2 are moved forward respectively on one hand by the pin 7c of the primary section 7 and on the other hand by the driving spring 8b of the secondary section 8, so that the movable lens unit 2 may be operated to move forward, that is, to be pulled forward, in the direction of the optical axis.

The described pin 7c keeps working until the movable lens unit 2 is stopped after hitting the rear end surface of the mount 1a of the front plate 1 by the front faces of the protruded pieces 2a of the movable lens unit 2, and an overridden stroke of the driving pin 9a is absorbed by the elastic deformation of the spring 7b. Meanwhile, the driving spring 8b of the secondary section 8 resultantly gives the pin 2b of the movable lens unit 2 a stroke greater than that of the pin 7c of the primary section 7.

In other words, the described movable lens unit 2 is still in such a state where is pressed in the direction that it is pulled forward by the elastic force of the spring 7b and one of the scissor-blade-like pieces of the driving spring 8b even when the lens unit 2 is in a position where it is being pulled forward. Therefore, the front surface of protruded pieces 2a of the movable lens unit 2 is pressed in contact with the rear end surface of the mount 1a, and conversion lens 5a is moved onto the optical axis so as to keep the optical axis of the described double-focus type taking lens 5 having been switched over to a long focal length vertical to the film plane, and the movable lens unit 2 may be stopped in a proper position.

Even in the course for reaching the above-mentioned stopping position, the elastic force of the driving spring 8b being applied to the pin 2b is constantly assisting the pin 7c to pull the movable lens unit 2 forward. Resultantly, there is also an advantage that the movable lens unit 2 can smoothly be pulled forward.

In a returning operation of the planetary gear mechanism 9, on the other hand, the described connecting rod 6a is rotated counterclockwise, and the rear faces of the protruded pieces 2a each of the movable lens unit 2 hit the base member of the aforementioned frame 4 and stops, and the retracting operation of the lens unit 2 is completed in this position. In this case also, the stroke-absorption action of the spring 7b and the pressing action of the driving spring 8b to the pin 2b are effected in the reverse directon, respectively, so as similarly to keep the optical axis of the movable lens unit 2 vertical to the film plane and to stop the movable lens unit 2 in a proper position. Further in this case, the described conversion lens 5a is forcibly escaped from the optical axis of the movable lens unit 2 by the retracting action of the lens barrel, so that the double-focus type lens 5 may be switched over to the short focal length mode.

According to the lens driving means described in this example of the invention, there can be realized a lens driving means of retractable lens barrel type cameras, in which the optical axis of the taking lens can be kept in a proper direction, and the lens can also be pulled forward or retracted properly to a fixed position with respect to the camera body.

Next another example, i.e., the second, of the invention will now be described with reference to FIG. 3.

The points different from the former example are in the lens driving means, and the like parts in each example are so identified by the same reference character as to omit the description thereof.

Figure 3:
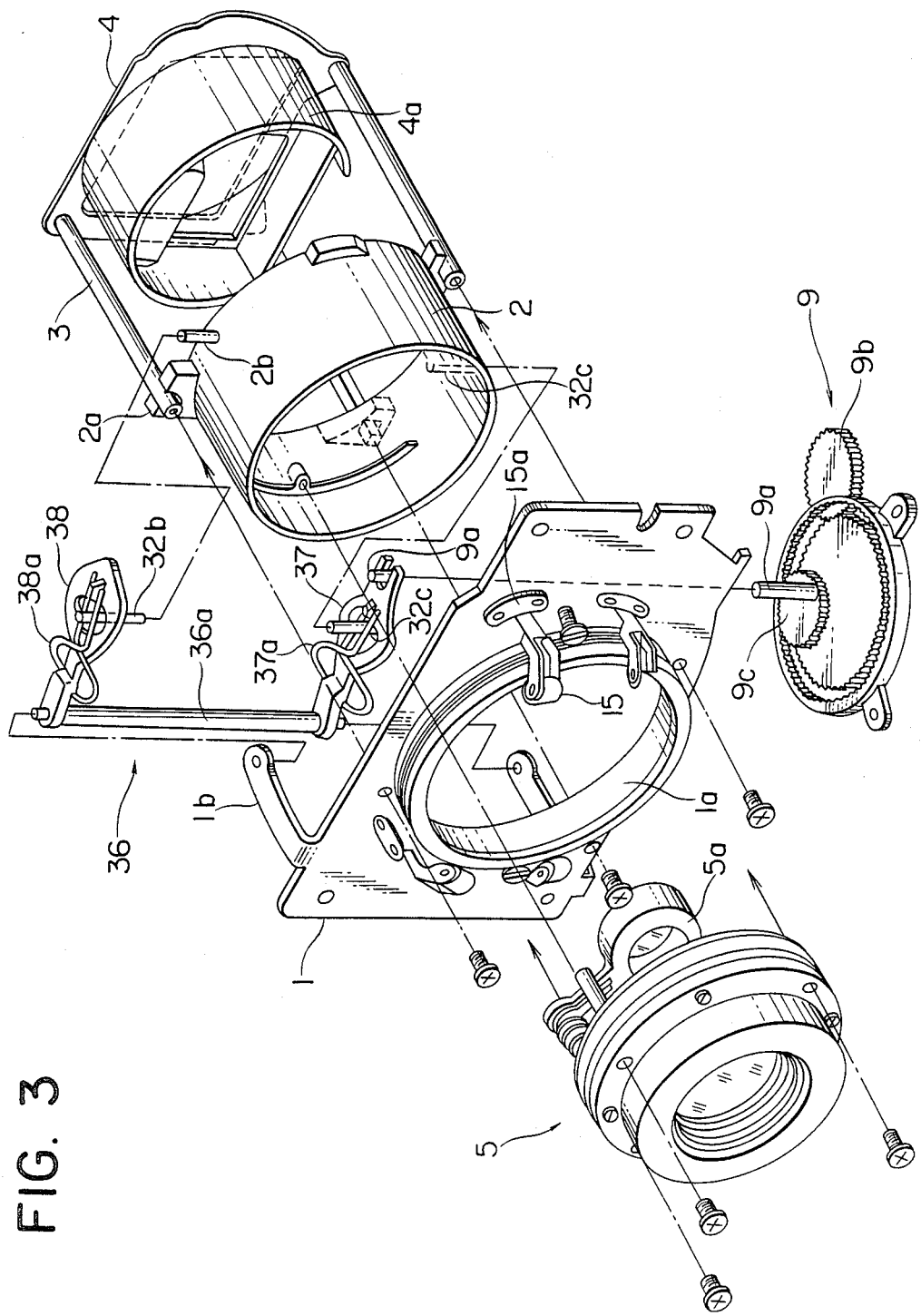
FIG. 3 is another example of the invention showing the movable lens unit having a taking lens and the driving mechanism.

In FIG. 3, numeral 36 indicates a lens driving member of the latter example designed in accordance with the invention, of which the working members, levers 37, 38 are fixed in a body to the upper and lower ends of connecting rod 36a, respectively, so that the lens driving member 36 can be in such a state that it may be coupled by utilizing the elasticity to arms 1b comprising an upper arm and a lower arm in a pair extended from the above-mentioned front plate 1 and it may be supported freely rotatable around the connecting rod 36a.

The levers 37, 38 each are provided with springs 37a, 38a inserted thereinto in a state of holding the protrusions of the levers 37, 38. In the holding position of the spring 37a of the lever 37, there also holds a pin 32c riveted to the lower part of the circumferential surface of the movable lens unit 2, and, on the other hand, in the holding position of the spring 38a of the lever 38, there holds a pin 32b riveted to the upper part of the circumferential surface of the movable lens unit 2.

And, the forked tip of the lever 37 holds driving pin 9a of planetary gear mechanism 9 provided to the camera body side, and the driving pin 9a drives the lever 38 as well as the lever 37 at the same time to rotate them.

When the driving gear 9b of the described planetary gear mechanism 9 is rotated by the revolution of a motor, the planetary gear mechanism 9c is rotated and at the same time moved around the sun-gear so as to reciprocate the driving pin 9a straight, as is well-known.

When the described driving pin 9a advances in the direction of the optical axis, the connecting rod 36a is rotated clockwise through the lever 37. On one hand, pin 32c is pushed by the elastic force of the spring 37a, and on the other hand, pin 32b is pushed by the elastic force of the spring 38a, both in the direction of the optical axis, so that the movable lens unit 2 is resultantly advanced, that is, pulled forward, in the direction of the optical axis.

The described pins 32b, 32c keep working until the movable lens unit 2 is stopped after hitting the rear end surface of the mount 1a of the front plate 1 by the front faces of the protruded pieces 2a of the movable lens unit 2, and an overridden stroke of the driving pin 9a, that is, the overrunning of the connecting rod 36a, is absorbed by the elastic deformation of the springs 37a, 38a.

Accordingly, the described movable lens unit 2 is still in such a state where is pressed in the direction that it is pulled forward by the elastic force of the springs 37a, 38a even when the lens unit 2 rests in a position where it is being pulled forward. Therefore, the front surface of protruded pieces 2a of the movable lens unit 2 is pressed in contact with the rear end surface of the mount 1a, and conversion lens 5a is moved onto the optical axis so as to keep the optical axis of the described double-focal type taking lens 5 having been switched over to a long focal length vertical to the film plane, and the movable lens unit 2 may be stopped in a proper position.

Even in the course for reaching the above-mentioned stopping position, the elastic force of the driving springs 37a, 38a can provide a well-balanced operation with the movable lens unit 2 on the whole periphery thereof. Resultantly, there is also an advantage that the movable lens unit 2 can smoothly be pulled forward.

Further, in a returning operation of the planetary gear mechanism 9, on the other hand, the described connecting rod 36a is rotated counterclockwise, and the rear faces of the protruded pieces 2a each of the movable lens unit 2 hit the base member of the aforementioned frame 4 and stops, and the retracting operation of the lens unit 2 is completed in this position. In this case also, the action of the springs 37a, 38a for absorbing the overrunning stroke of the drive pin 9a and their pressing action derived from the elastic deformation thereof to the pins 32b, 32c are effected in the reverse direction, respectively, so as similarly to keep the optical axis of the movable lens unit 2 vertical to the film plane and to stop the movable lens unit 2 in a proper position. Further in this case, the described conversion lens 5a is forcibly escaped from the optical axis of the movable lens unit 2 by the retracting action of the lens barrel, so that the double-focus type lens 5 may be switched over to the short focal length mode.

According to the latter example described above, there can also be realized a camera having a lens driving means in which the optical axis of the taking lens can be kept in a proper direction, and the lens can also be pulled forward or retracted properly to a fixed position with respect to the camera body.

What is claimed is:

1. A camera comprising:
   a lens unit which is slidable through a lens stroke defined by stoppers along an optical axis for varying a focal length thereof, said stoppers comprising a frame and a cylindrical lens mount attached to a front plate, said frame and said front plate constituting a housing;
   a driving mechanism having a predetermined driving stroke to slide said lens unit; and
   a driving member having at least two parts which are connected to circumferential parts of said lens unit, said driving member being mounted on a camera body and adapted to transmit a driving force to said parts, said driving member comprising a stroke absorber for absorbing an overrunning stroke of said driving mechanism after said lens unit abuts against one of said stoppers.

2. The camera of claim 1, wherein said driving member comprises a rotatable connecting rod which supports said two parts.

3. The camera of claim 2, wherein said two parts are connected to both ends of said rod.

4. The camera of claim 1, wherein said driving stroke is longer than said lens stroke.

5. The camera of claim 1, wherein said stroke absorber is a spring.

6. The camera of claim 1, wherein said driving mechanism comprises a planetary gear mechanism.

7. The camera of claim 1, wherein said driving member is mounted on said front plate.

8. A camera comprising:
a housing having a frame and a front plate on which a lens mount is formed;
a lens unit which is slidable through said lens mount along an optical axis for varying a focal length thereof, said lens unit being capable of sliding through a lens stroke defined by said frame and said front plate;
a driving mechanism having a predetermined driving stroke;
and a driving member having at least two parts which are connected to circumferential parts of said lens unit, said driving member being mounted on said front plate and comprising a stroke absorber for absorbing an overrunning stroke of said driving mechanism after said lens unit abuts against said frame or said front plate.

9. The camera of claim 8 wherein said driving member comprises a rotatable connecting rod which supports said two parts.

10. The camera of claim 9 wherein said two parts are connected to the both ends of said rod.

11. The camera of claim 8 wherein said driving stroke is longer than said lens stroke.

12. The camera of claim 8 wherein said stroke absorber is a spring.

13. The camera of claim 8 further comprising a plurality of rollers mounted on a front surface of said front plate for guiding and supporting said lens unit.

14. The camera of claim 13 wherein said rollers press the outer circumferential surface of said lens unit.

15. The camera of claim 13 wherein said rollers are made of a synthetic resin.

16. The camera of claim 8 wherein said frame has a light-shielding member.

17. The camera of claim 8 wherein said driving mechanism comprises a planetary gear mechanism.

18. A camera comprising:
a housing;
a lens unit which is slidable through a lens stroke along an optical axis, a driving mechanism having a predetermined driving stroke which is longer than said lens stroke; and
a driving member having at least two parts which are connected to circumferential parts of said lens unit, said driving member being mounted on said housing and comprising a stroke absorber for absorbing the difference between said driving stroke and said lens stroke.

* * * * *